UNITED STATES PATENT OFFICE.

KARL PATHE AND OSCAR DRESSEL, OF ELBERFELD, GERMANY, ASSIGNORS TO THE FARBENFABRIKEN, VORMALS FR. BAYER & CO., OF SAME PLACE.

RED DYE.

SPECIFICATION forming part of Letters Patent No. 532,479, dated January 15, 1895.

Application filed September 21, 1894. Serial No. 523,686. (Specimens.) Patented in France December 22, 1893, No. 228,125.

*To all whom it may concern:*

Be it known that we, KARL PATHE and OSCAR DRESSEL, chemists, doctors of philosophy, subjects of the Emperor of Germany, residing at Elberfeld, Prussia, Germany, (assignors to the FARBENFABRIKEN, VORMALS FR. BAYER & CO., of Elberfeld,) have invented certain new and useful Improvements in the Manufacture of Red Azo Dye, (for which the aforesaid FARBENFABRIKEN, VORMALS FR. BAYER & CO., has already obtained Letters Patent in France, No. 228,125, dated December 22, 1893;) and we do hereby declare the following to be an exact and clear description of our invention.

Our invention relates to the production of red substantive dye-stuffs by combining one molecular proportion of diazotized dehydro-thio-para-toluidin (or the corresponding quantity of the diazo compound of the homologous dehydrothiometa-xylidin or dehydrothio pseudo-cumidin) with one molecular proportion of amidonaphtholdisulfo acid $$(NH_2:OH:SO_3H:SO_3H = 2:5:7:1).$$

The aforesaid amidonaphtholdisulfo acid is, for example, obtained in the following manner: 22.3 parts, by weight, of beta naphthylamine sulfo acid 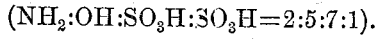 are gradually stirred into ninety parts, by weight, of fuming sulfuric acid containing forty per cent. of sulfuric anhydride and the mixture is heated at about 100° centigrade, while small tests from time to time are taken out from the sulfonaion mixture and diazotized in a suitable manner. Heating is continued until such a diazo compound when combined in an alkaline solution with the so called "R salt," yields a dye-stuff soluble with great readiness in water. At this stage the whole sulfuric mixture is poured into ice-water and the resulting liquid is neutralized with lime-water. After filtering off the calcium sulfate a filtrate is obtained which contains the calcium salt of the so formed naphthylamin-trisulfo acid $$(NH_2:SO_3H:SO_3H:SO_3H = 2:5:7:1).$$

This calcium salt is transformed in the well known manner into the potassium salt and the resulting solution of the potassium salt is evaporated until on the addition of hydrochloric acid to a test portion effects the separation of the acid potassium salt of the above naphthylamine trisulfo acid in crystals. When this stage is arrived at the whole evaporated solution is acidulated by means of hydrochloric acid (21° Baumé) and cooled down, and finally the crystalline precipitate is filtered off, pressed and dried. The thus obtained acid potassium salt of the naphthylamine trisulfo acid

is melted with alkalies, for instance, as follows: Thirty-six parts, by weight, of the acid potassium salt of the above naphthylamine trisulfo acid are heated with sixty-nine parts, by weight, of caustic potassa and thirty-four parts, by weight, of water in a closed vessel capable of withstanding pressure and provided with stirring apparatus at about 180° centigrade. This operation is prolonged until a test portion taken out from the melted mass and combined with a suitable diazo compound no longer shows any increase of the so formed dye-stuff. This will be after from about eight to ten hours. The melted mass is then diluted with a small quantity of water and acidulated with hydrochloric acid. The acid potassium salt of the new amidonaphtholdisulfo acid

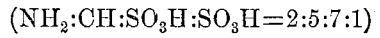

then separates as a crystalline mass which is filtered off, pressed and dried. In order to purify, this acid salt is redissolved in hot water and precipitated by means of potassium chlorid. Thus it forms white needles. The solution of this acid potassium salt in water shows a violet blue fluorescence, which turns into green on adding alkali.

In carrying out the preparation of the aforesaid dye-stuffs we can, for example, proceed as follows: Twenty-four parts, by weight, of dehydro-thiotoluidin are mixed in a very fine condition with water and forty parts, by weight, of hydrochloric acid (containing thirty-three per cent. of pure hydrochloric acid) are added to the above mixture which is well cooled. On adding seven parts, by weight, of sodium nitrite dissolved in water the dehydrothio para toluidin base is converted in the well known manner into its diazo compound. The resulting diazo solution is allowed to run gradually into a solution prepared by dissolving 35.7 parts, by weight, of the acid potassium salt of the above described amidonaphtholdisulfo acid in water with the addition of one hundred and ten parts by weight, of sodium carbonate. After about twelve hours the mixture is heated at about 90° centigrade and mixed with a suitable quantity of common salt, in order to separate the dye-stuff. If necessary the dye may be purified once more by redissolving the same in water and salting out. After filtering off, pressing and drying, the dye-stuff forms a brown powder easily soluble in water with red color, almost insoluble in alcohol and concentrated soda-lye. The color of the watery solution of the dye-stuff is not altered by the addition of dilute ammonia liquor, a solution of sodium carbonate or dilute soda-lye. By concentrated sulfuric acid (66° Baumé) the dye-stuff is dissolved with a bluish-red color. On adding ice-water to this sulfuric acid solution reddish-brown flakes are precipitated, which represent the free sulfo acid of the dye-stuff.

The dye produces on unmordanted cotton clear red shades fast to the action of alkali and acid. When fixed on the fiber it can be rediazotized and coupled with so-called developers as for example, beta naphthol, new shades of great fastness to soaping and milling being produced in this manner.

Analogous or similar dye-stuffs are obtained, if in the last described process the dehydrothio para toluidin is replaced by the corresponding quantity of the homologous dehydrothio-meta xylidin or dehydrothio pseudocumidin.

The process for producing dyes can also be carried out in an acid solution instead of using an alkaline solution as hereinbefore described.

Of course, the well known sulfo derivatives of the above named thio bases can also be employed in the above process, dye-stuffs being thus produced which in general, show the same properties as those derived from the aforesaid thio bases; but owing to the greater cheapness of such thio bases compared with that of the sulfo derivatives thereof we prefer to use the thio bases instead of the sulfo derivatives thereof for the production of the dyes hereinbefore defined.

When in the claims of this specification we refer to diazotized dehydrothio-para-toluidin base, we mean to include as equivalents thereof the corresponding quantity of the diazo compound of the homologous dehydrothio meta xylidin or dehydrothio-pseudocumidin or the corresponding quantity of the diazo derivatives of the named bases.

Having now described our invention and in what manner the same is to be performed, what we claim as new, and desire to secure by Letters Patent, is—

1. The process for the production of red substantive dye-stuffs resulting from the combination of one molecular proportion of diazotized dehydrothio-para-toluidin base with one molecular proportion of the hereinbefore described amidonaphtholdisulfo acid $(NH_2:OH:SO_3H:SO_3H=2:5:7:1)$ in an alkaline or acid solution.

2. As a new article of manufacture the dye which is producible from one molecular proportion of diazotized dehydrothio para toluidin having the formula:

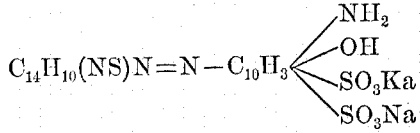

forming a brown powder easily soluble in water with a red color, almost insoluble in concentrated soda-lye and alcohol, being dissolved by concentrated sulfuric acid with a bluish-red color, reddish-brown flakes being separated on the addition of ice-water to the above sulfuric acid solution, producing on unmordanted cotton clear red shades of great fastness to the action of alkali and acid being rediazotizable when fixed on the fiber and producing new shades of great fastness to soaping and milling when, after previous diazotization on the fiber, being coupled with any dye-stuff component for developer as, for instance, beta naphthol.

In testimony whereof we have signed our names in the presence of two subscribing witnesses.

KARL PATHE.
OSCAR DRESSEL.

Witnesses:
T. H. STRAUSS,
A. STRAUSS.